(12) United States Patent
Guan et al.

(10) Patent No.: US 11,950,585 B2
(45) Date of Patent: Apr. 9, 2024

(54) IMAGING WITH WIRELESS COMMUNICATION SIGNALS

(71) Applicant: International Business Machines Corporation, Armonk, NY (US)

(72) Inventors: Junfeng Guan, Champaign, IL (US); Bodhisatwa Sadhu, Peekskill, NY (US); Arun Paidimarri, White Plains, NY (US); Asaf Tzadok, New Castle, NY (US); Alberto Valdes Garcia, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 16/799,364

(22) Filed: Feb. 24, 2020

(65) Prior Publication Data

US 2021/0215814 A1 Jul. 15, 2021

Related U.S. Application Data

(60) Provisional application No. 62/959,029, filed on Jan. 9, 2020.

(51) Int. Cl.
*G01S 13/89* (2006.01)
*A01M 1/02* (2006.01)
*G01S 7/00* (2006.01)
*G01S 13/08* (2006.01)
*A01M 1/10* (2006.01)

(52) U.S. Cl.
CPC ............ *A01M 1/023* (2013.01); *A01M 1/026* (2013.01); *G01S 7/006* (2013.01); *G01S 13/08* (2013.01); *G01S 13/89* (2013.01); *A01M 1/103* (2013.01)

(58) Field of Classification Search
CPC ... G01S 7/003–006; G01S 13/08; G01S 13/89
See application file for complete search history.

(56) References Cited

U.S. PATENT DOCUMENTS 8,289,209 B2 10/2012 Corman et al.
8,711,038 B2 4/2014 Reede et al.
(Continued)

FOREIGN PATENT DOCUMENTS

DE 102015202874 A1 * 8/2016
DE 102015222043 A1 * 5/2017
(Continued)

OTHER PUBLICATIONS

Braun, K.. "OFDM Radar Algorithms in Mobile Communication Networks." (2014). (Year: 2014).*
(Continued)

*Primary Examiner* — Matthew M Barker
(74) *Attorney, Agent, or Firm* — Scully, Scott, Murphy & Presser, P.C.

(57) ABSTRACT

Methods and systems for estimating a distance to an object are described. In an example, a device can receive a reflected signal of a modulated signal being used in a wireless transmission of data. The reflected signal can be a reflection
(Continued)

of the modulated signal from at least one object. The device can estimate a distance to the at least one object based on the modulated signal and the reflected signal. Further, the device can use the estimated distance to image a scenery including the at least one object.

19 Claims, 9 Drawing Sheets

(56) References Cited

U.S. PATENT DOCUMENTS

| | | | |
|---|---|---|---|
| 9,261,576 | B2 | 2/2016 | Keegan et al. |
| 10,955,547 | B2* | 3/2021 | Ray .................... H04L 27/2332 |
| 11,125,854 | B2* | 9/2021 | Ray ...................... G01S 13/825 |
| 2005/0251844 | A1 | 11/2005 | Martone et al. |
| 2011/0193739 | A1* | 8/2011 | Strauch ............... H04L 27/2647 |
| | | | 342/146 |
| 2012/0032855 | A1 | 2/2012 | Reede et al. |
| 2016/0356885 | A1* | 12/2016 | Hakobyan ............... G01S 7/352 |
| 2018/0115439 | A1 | 4/2018 | Bhatti et al. |
| 2018/0199377 | A1 | 7/2018 | Sanderovich et al. |
| 2020/0052941 | A1* | 2/2020 | Lang ..................... G01S 7/0234 |
| 2020/0150263 | A1* | 5/2020 | Eitan ..................... G01S 13/003 |
| 2020/0169362 | A1* | 5/2020 | Altintas ................ H04L 5/0044 |
| 2020/0174095 | A1* | 6/2020 | Altintas .............. H04L 27/2634 |
| 2020/0209378 | A1* | 7/2020 | Yokev ................... H04W 84/12 |
| 2020/0229102 | A1* | 7/2020 | Gubeskys ........... H04W 52/146 |
| 2020/0400806 | A1* | 12/2020 | Choi ...................... G01S 7/288 |
| 2021/0041549 | A1* | 2/2021 | Kerner ................... G01S 7/006 |
| 2021/0165073 | A1* | 6/2021 | Rouwet .................. G01S 7/292 |
| 2021/0208237 | A1* | 7/2021 | Ravenscroft ........ H04L 27/2626 |
| 2022/0317240 | A1* | 10/2022 | Rydström ............. G01S 13/931 |

FOREIGN PATENT DOCUMENTS

| | | |
|---|---|---|
| KR | 101953185 B1 | 2/2019 |
| WO | 2019050264 A1 | 3/2019 |

OTHER PUBLICATIONS

C. Sturm and W. Wiesbeck, "Waveform Design and Signal Processing Aspects for Fusion of Wireless Communications and Radar Sensing," in Proceedings of the IEEE, vol. 99, No. 7, pp. 1236-1259, Jul. 2011, doi: 10.1109/JPROC.2011.2131110. (Year: 2011).*

Barneto, C. B., et al., "Full-Duplex OFDM Radar With LTE and 5G NR Waveforms: Challenges, Solutions, and Measurements", IEEE Transactions on Microwave Theory and Techniques, Oct. 2019, 13 pages, vol. 67, Issue 10.

Gu, X., et al., "Development, Implementation, and Characterization of a 64-Element Dual-Polarized Phased-Array Antenna Module for 28-GHz High-Speed Data Communications", IEEE Transactions on Microwave Theory and Techniques, Jul. 2019, pp. 2975-2984, vol. 67, No. 7.

Sadhu, B., et al., "A 128-element Dual-Polarized Solware-Defined Phased Array Radio for mm-wave 5G Experimentation", mmNets'18, Oct. 29, 2018, pp. 21-25, New Delhi, India.

Valdes-Garcia, A., et al., "A Fully-Integrated Dual-Polarization 16-Element W-band Phased-Array Transceiver in SiGe BiCMOS", 2013 IEEE Radio Frequency Integrated Circuits Symposium (RFIC), Date of Conference: Jun. 2-4, 2013, pp. 375-378, Conference Location: Seattle, WA.

Sadhu, B., et al., "A 28-GHz 32-Element TRX Phased-Array IC With Concurrent Dual-Polarized Operation and Orthogonal Phase and Gain Control for 5G Communications", IEEE Journal of Solid-State Circuits, Dec. 2017, pp. 3373-3391, vol. 52, No. 12.

Guan, J., et al., "3D Imaging using mmWave 5G Signals", submitted to IEEE RFIC Symposium 2020, Jan. 2020, 4 pages.

Sadhu, B., et al., "A Software-Defined Phased Array Radio with mmWave to Software Vertical Stack Integration for 5G Experimentation", 2018 IEEE/MTT-S International Microwave Symposium—IMS, Date of Conference: Jun. 10-15, 2018, pp. 1323-1326, Conference Location: Philadelphia, PA.

Abrudan, T. E., et al., "Time Synchronization and Ranging in OFDM Systems Using Time-Reversal", IEEE Transactions on Instrumentation and Measurement, Dec. 2013, pp. 3276-3290, vol. 62, No. 12.

* cited by examiner

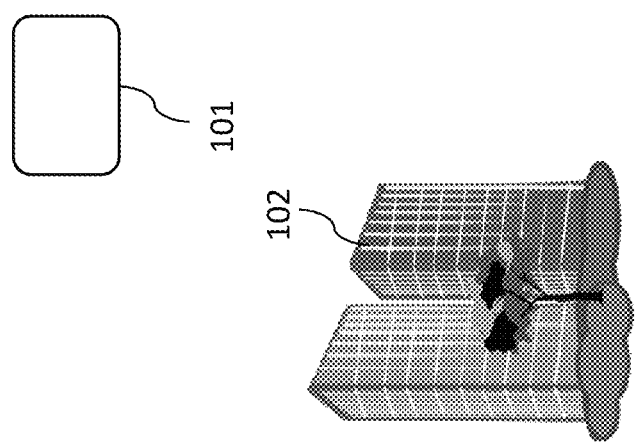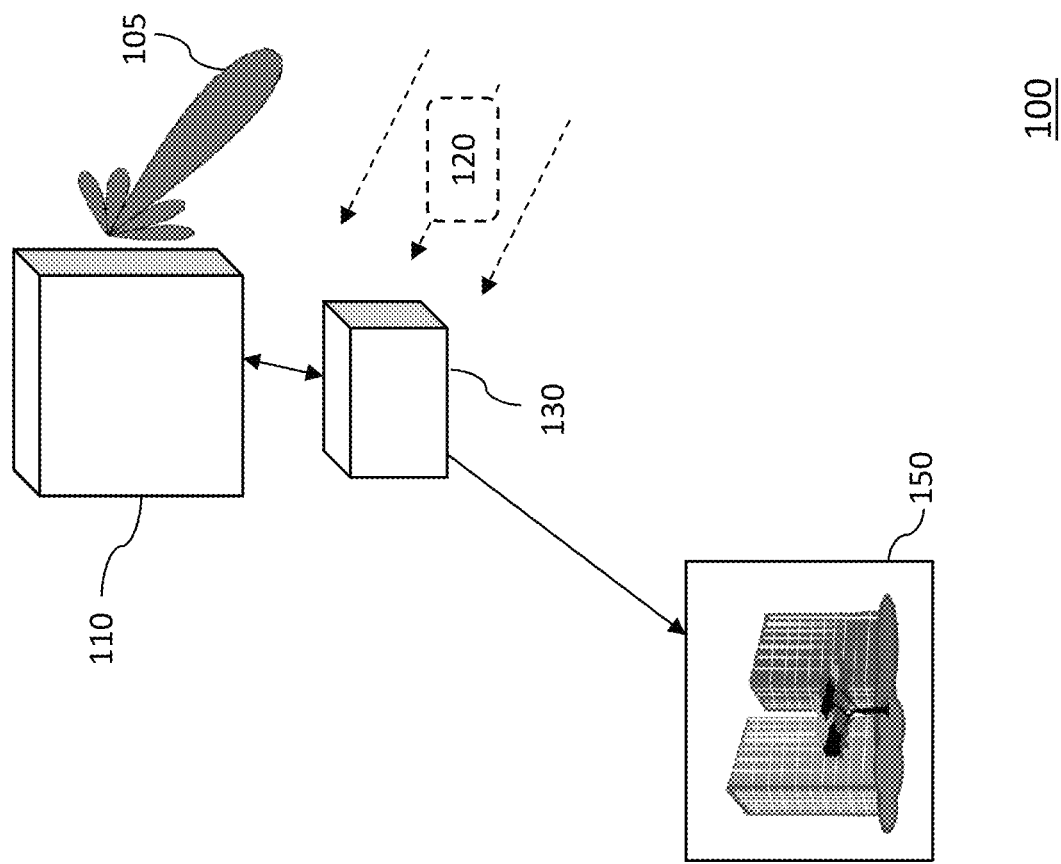
Fig. 1

IMAGING WITH WIRELESS COMMUNICATION SIGNALS

BACKGROUND

The present application relates generally to wireless communication technologies. In one aspect, the present application relates more particularly to generation of image data based on transmission of communication signals.

In wireless communication technologies, data can be transmitted from a first device to a second device. To transmit the message over a wireless channel, a device such as a transmitter or a transceiver can modulate a carrier frequency with data to generate a modulated signal. In some examples, the device can also modulate a plurality of sub-carrier frequencies with the data (e.g., using orthogonal frequency-division multiplexing (OFDM) techniques) to generate the modulated signal, such that the modulated signal can be transmitted using the plurality of sub-carrier frequencies.

BRIEF SUMMARY

In some examples, a method for estimating a distance to an object is generally described. The method can include receiving a reflected signal of a modulated signal being used in a wireless transmission of data. The reflected signal can be a reflection of the modulated signal from at least one object. The method can further include estimating a distance to the at least one object based on the modulated signal and the reflected signal.

In some examples, a method for estimating a distance to an object is generally described. The method can include receiving a loopback signal of a modulated signal being used in a wireless transmission of data. The method can further include receiving a reflected signal of the modulated signal. The reflected signal being a reflection of the modulated signal from at least one object. The method can further include estimating a distance to the at least one object based on the loopback signal and the reflected signal.

In some examples, a method for estimating a distance to an object is generally described. The method can include receiving a plurality of reflected signals having a plurality of carrier frequencies. The plurality of reflected signals can be reflections of a plurality of modulated signals. The plurality of modulated signals can use the plurality of carrier frequencies to wirelessly transmit data. The method can further include estimating a distance to the at least one object based on the plurality of modulated signal and the plurality of reflected signals.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a diagram showing an example system that can implement imaging with wireless communication signals in one embodiment.

DETAILED DESCRIPTION

Figure 2:
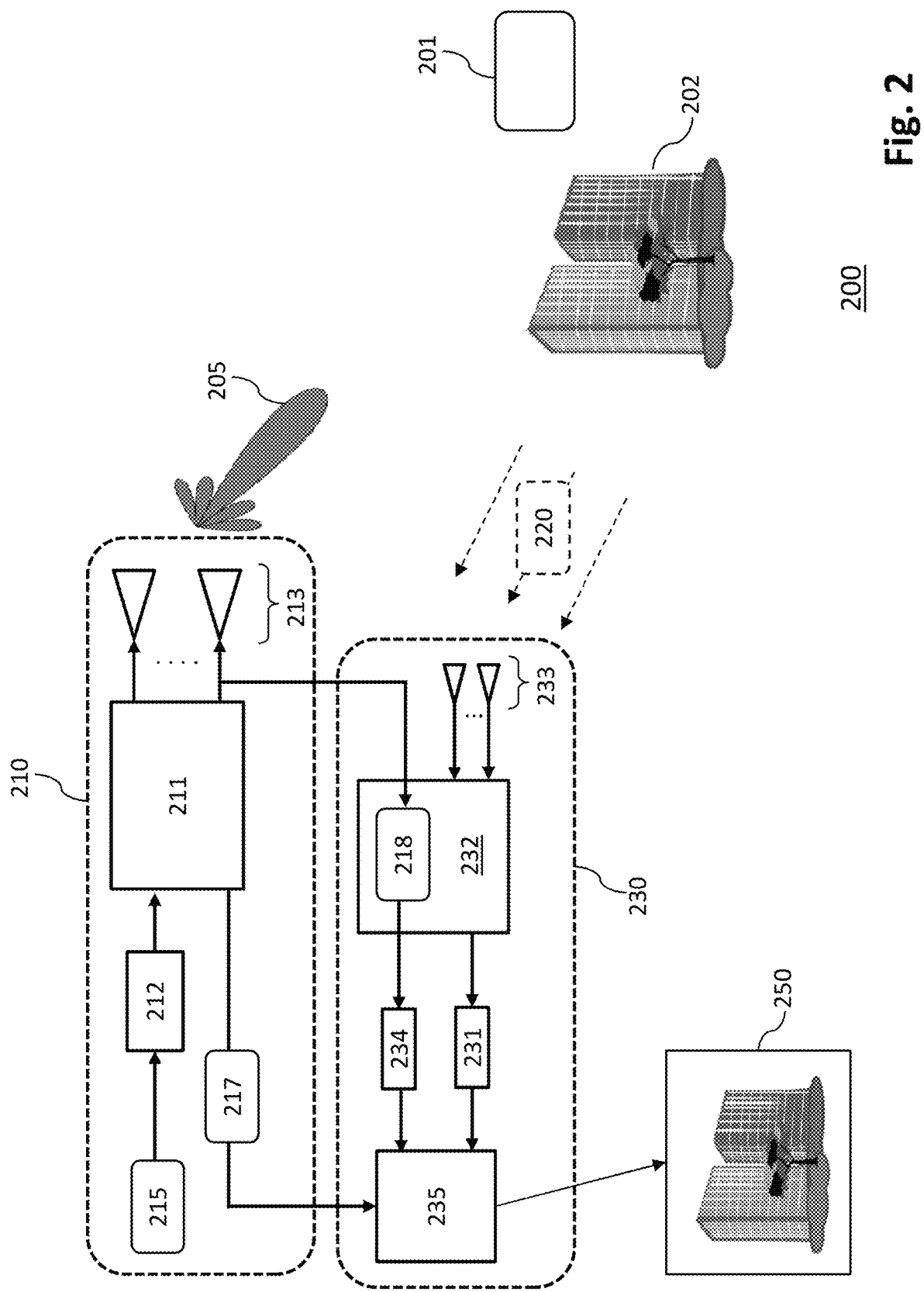
FIG. 2 is a diagram showing an embodiment of imaging with wireless communication signals.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when a first element is connected to a second element, the first and second elements can be operatively connected, communicatively connected, directly connected, or indirectly connected (e.g., with other components in-between).

Methods and systems described herein can determine the distance to an object using communication signals being wirelessly transmitted in a directional communication system. For example, a communication signal can be a signal carrying data directed to a designated device. An example communication signal can be a modulated signal generated from modulation of at least one carrier frequency modulated with a data, (e.g., data representing a message, an image, application data, and/or other types of data that can be communicated between two devices). The determined distances of objects can be used to provide three-dimensional (3D) imaging of a scenery including the objects. The objects' distances can be determined without altering the data, the associated waveforms, or wireless communication protocols. Further, the determined distances can be used to refine image data of the imaged scenery, such as improving accuracy (reduction of signal-to-noise ratio) or improving range resolution. Furthermore, the methods and systems described herein can be integrated in communication systems base stations, such as 5G communications base station, without affecting functions of the base stations. In an example, by integrating the methods and systems described herein in a base station, the base station can perform its typical communications of data to different devices in different directions, and provide ranging or distance information of objects that can be non-communicating entities surrounding environments of the devices.

FIG. 1 is a diagram showing an example system that can implement imaging with wireless communication signals in one embodiment. The system 100 can be a wireless communication system. The system 100 can include a device 101, a device 110, and a device 130. The device 101 can be a receiving device, such as a user device configured to receive wireless communication signals. The device 101 can be, for example, a mobile phone, a computer, a laptop computer, a tablet computer, a router, a receiver, and/or other types of devices that can be configured to receive wireless communication signals. The device 110 can be transmitting device, such as a communication device configured to transmit wireless communication signals. The device 110 can be, for example, a transmitter, a transceiver, a base station of a network, and/or other types of device that can transmit wireless communication signals. In an example embodiment, the device 110 can be a base station or a WIFI access point of a wireless communication network, where the wireless communication network can be a cellular network, a $5^{th}$ generation (5G) cellular network, or other types of wireless communication network. The device 130 can be configured to be in communication with the device 110. In an example embodiment, the device 130 can be coupled to the device 110, embedding in the device 110, or integrated with the device 110, to implement the system 100.

In an example, the device 110 can generate a modulated signal 105 and can wirelessly transmit the modulated signal 105 to the device 101, at a transmission angle directed towards the device 101. The device 110 can generate the modulated signal 105 by modulating at least one carrier frequency with. The data can be information and/or data designated for the device 101. Objects within an environment of the device 101 can reflect the modulated signal 105 during the wireless transmission of the modulated signal 105 from the device 110 to the device 101. For example, an object 102 can reflect the modulated signal 105, and the device 130 can capture or detect the reflections of the modulated signal 105 as a reflected signal 120. In an example embodiment, the objects reflecting the modulated signal 105 can be non-communicating entities, such as devices or objects that may not be equipped to transmit communication signals. For example, the object 102 can be a tree, a building, a person, a vehicle, etc.

The device 130 can include receivers, antennas, and/or sensors (further described below) configured to capture or detect the reflected signal 120. The device 130 can include processing components configured to process the reflected signal 120. For example, the device 130 can include at least one of a processor, a memory, a controller, and/or other types of components configured to process the reflections of the modulated signal 105 from objects. To be described in more detail below, the device 130 can process the reflected signal 120 to estimate a distance of objects, such as the object 102, surrounding the device 101. The distance of the object 102 can be a distance between the object 102 and the device 110, or a distance between the object 102 and the device 130. The device 130 can also determine a receiving angle of the reflected signal 120. The estimated distance and the receiving angle can be used by the device 130, or another image processing device, to estimate a position of the object 102 with respect to the device 101 and/or the device 130. The estimated distance and/or the estimated position can be used by the device 130 to image a scenery surrounding the device 101, resulting in generation of image data representing an image 150. The device 130 can be integrated with a base station (e.g., device 110) to allow the base station to simultaneously perform estimation of object distances and wireless communication of data.

FIG. 2 is a diagram showing an embodiment of imaging with wireless communication signals. The system 200 can be a wireless communication system. The system 200 can include a device 201, a device 210, and a device 230. The device 201 can be a receiving device, such as a user device configured to receive wireless communication signals. The device 201 can be, for example, a mobile phone, a computer, a laptop computer, a tablet computer, a router, a receiver, and/or other types of devices that can be configured to receive wireless communication signals. The device 210 can be a transmitting device, such as a communication device configured to transmit and/or receive wireless communication signals. The device 210 can be, for example, a transmitter, a transceiver, a base station of a network, and/or other types of device that can transmit wireless communication signals. In an example embodiment, the device 210 can be a base station or a WIFI access point of a wireless communication network such as a cellular network, a $5^{th}$-generation (5G) cellular network, or the like. The device 230 can be configured to be in communication with the device 210. In an example embodiment, the device 210 and the device 230 can be components of a wireless communication device, such as a base station. In another example embodiment, the device 230 can be coupled to the device 210, embedding in the device 210, or integrated with the device 210, to implement the system 200.

In an example, the device 210 can generate a modulated signal 205 and can wirelessly transmit the modulated signal 205 to the device 201. The device 210 can include a transmitter 211 and a digital-to-analog converter (DAC) 212. The transmitter 211 can be coupled to an antenna 213. The antenna 213 can be, for example, a single antenna, a multiple-in multiple-out (MIMO) antenna, a phase array, an antenna array with mechanical steering, or other types of antenna. The DAC 212 can receive a signal representing data, such as a baseband signal 215. The data can be information and/or data designated for the device 201. The DAC can convert the baseband signal 215 into an analog signal. The transmitter 211 can receive the analog signal, converted from the baseband signal 215, from the DAC 212. The transmitter 211 can modulate at least one carrier frequency using the received analog signal to generate the modulated signal 205. The transmitter 211 can wirelessly transmit the modulated signal 205 to the device 201 via the antenna 213. Objects within an environment of the device 201 can reflect the modulated signal 205 during the wireless transmission of the modulated signal 205 from the device 210 to the device 201. For example, an object 202 can reflect the modulated signal 205, and the device 230 can capture or detect the reflections of the modulated signal 205 as a reflected signal 220. In an example embodiment, the objects reflecting the modulated signal 205 can be non-communicating entities, such as devices or objects that may not be equipped to transmit communication signals. For example, the object 202 can be a tree, a building, a person, a vehicle, etc.

The device 230 can include a sensing device 232, an antenna 233, and/or a processor 235. The antenna 233 can be coupled to the sensing device 232. The antenna 233 can be configured to capture or detect the reflected signals 220. The antenna can be, for example, a single antenna, a multiple-in multiple-out (MIMO) antenna, a phase array, an antenna array with mechanical steering, or other types of antenna. In some examples, the sensing device 232 and the antenna 233 can be components of a receiver device. In an example embodiment, the device 230 can include an analog-to-digital converter (ADC) 231 configured to convert the reflected signals 220 into digital signals. The sensing device 232 can be further configured to capture or receive a loopback signal 218 from the transmitter 211. The loopback signal 218 can be a loopback of the modulated signal 205 from the transmitter 211. The loopback signal 218 can be identical to the modulated signal 205. In an example embodiment, there can be a wired connection between the transmitter 211 of the device 210 and the sensing device 232, and the loopback signal 218 can be a baseband signal, an intermediate frequency (IF) signal, or a radio frequency (RF) signal obtained from the wired connection. In another example embodiment, the loopback signal 218 can be obtained from IF leakage or RF leakage occurring at the transmitter 211. In an example embodiment, the transmission of the modulated signal 205 can be split into two paths (e.g., wired connections or wireless channels), where one path feeds to the antenna 213 and the other path feeds to the sensing device 232.

The processor 235 can be, for example, a computer, a controller, a microprocessor, and/or other types of computing device. The processor 235 can receive the digital signals (converted from the reflected signals 220) from the ADC 231, the loopback signal 218 from the sensing device 232, and configuration data 217 from the transmitter 211. In some examples, the loopback signal 218 can be sent to a ADC 234, and the ADC 234 can perform an analog to digital conversion on the loopback signal 218 and transmit a digital version of the loopback signal 218 to the processor 235. The configuration data 217 can include configurations of the transmitter 211 and/or the antenna 213 associated with the transmission of the modulated signal 205. For example, the configuration data 217 can include multiple-in multiple-out (MIMO) configurations of a MIMO antenna (e.g., antenna 213), beam forming configurations of a phase array (e.g., antenna 213), or mechanical steering directions of an antenna array (e.g., antenna 213), that was used for the wireless transmission of the modulated signal 205. In an example, the configuration data 217 can indicate transmission angle that was used by the device 110 to transmit the signal 205. The processor 235 can be configured to estimate a distance of the object 202 using the reflected signal 220, the loopback signal 218, and/or the configuration data 217. For example, the processor 235 can receive the reflected signal 102 at a receiving angle $a_r$, and determine that the reflected signal 120 is a reflection of the modulated signal 105 transmitted at a transmission angle $a_t$. The processor 235 can estimate a distance and a position of the object that reflected the modulated signal 105 based on the angles $a_r$, $a_t$, and based on other attributes such as signal strength of the reflected signal 120, and other configurations of the device 110 that was used to transmit the modulated signal. The processor 235 can be further configured to generate image data representing an image 250 of a scenery surrounding the device 201. The processor 235 can be further configured to refine the image data, such as enhancing accuracy and resolution of the image data.

In an example where the modulated signal 205 is generated based on modulation of a single carrier frequency. The modulated signal 205 can experience phase shift, signal attenuation, and addition of noise, during the wireless transmission from the device 210 to the device 201. As a result of the phase shift and attenuation, the reflected signal 220 can be a phased shifted and attenuated version of the modulated signal 205 with added noise. The processor 235 can obtain the loopback signal 218 that can be identical to the modulated signal 205 before the modulated signal 205 experiences any phase shift or attenuation. The processor 235 can apply a matched filter on the reflected signal 220 to generate a filtered signal. The processor 235 can use the filtered signal to extract a time of flight (ToF) and signal strength of the reflected signal 220. The processor 235 can estimate the distance of the object 202 based on the extracted ToF and signal strength.

In an example where the modulated signal 205 is generated based on modulation of a plurality of sub-carrier frequencies, such as orthogonal frequency-division multiplexing (OFDM), the data to be transmitted can be split into multiple subsignals, and each subsignal can modulate a respective sub-carrier frequency. As the modulated signal 205 includes multiple sub-carrier frequencies, the reflected signal 220 can also have the same set of multiple sub-carrier frequencies. The processor 235 can apply an element-wise division on a plurality of symbols of the reflected signal 220 by corresponding symbols of the loopback signal 218. For example, the processor 235 can divide a k-th symbol of the reflected signal 220 by the k-th symbol of the loopback signal 218. The result of the element-wise division can be a frequency response, such as a wideband channel frequency response. The processor 235 can estimate the distance of the object 202 based on the frequency response. In an example embodiment, the processor can apply fast Fourier transform (FFT) on the frequency response to determine a distance of the object 202.

Figure 3:
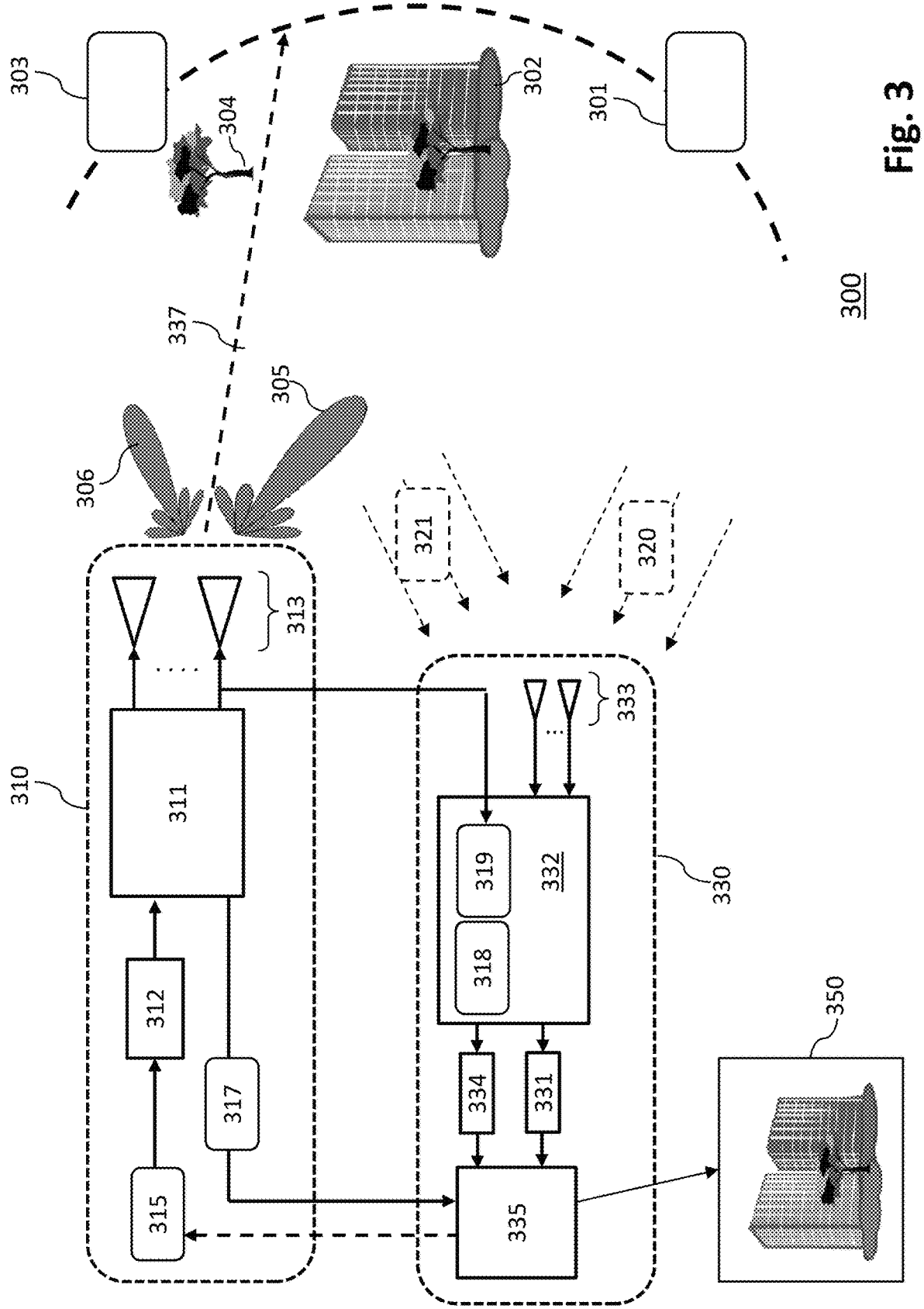
FIG. 3 is a diagram showing another embodiment of imaging with wireless communication signals.

FIG. 3 is a diagram showing an embodiment of imaging with wireless communication signals. The system 300 can be a wireless communication system. The system 300 can include a device 301, a device 303, a device 310, and a device 330. The devices 301 and 303 can be receiving devices, such as user devices configured to receive wireless communication signals. The device 301 or the device 303 can be, for example, a mobile phone, a computer, a laptop computer, a tablet computer, a router, a receiver, and/or other types of devices that can be configured to receive wireless communication signals. The device 310 can be transmitting device, such as a communication device configured to transmit and/or receive wireless communication signals. The device 310 can be, for example, a transmitter, a transceiver, a base station of a network, and/or other types of device that can transmit wireless communication signals. In an example embodiment, the device 310 can be a base station or a or a WIFI access point of a wireless communication network such as a cellular network, a $5^{th}$-generation (5G) cellular network, or the like. The device 330 can be configured to be in communication with the device 310. In an example embodiment, the device 310 and the device 330 can be components of a wireless communication device, such as a base station. In another example embodiment, the device 330 can be coupled to the device 310, embedding in the device 310, or integrated with the device 310, to implement the system 300.

The device 310 can include a transmitter 311 and a digital-to-analog converter (DAC) 312. The transmitter 311 can be coupled to an antenna 313. The antenna 313 can be, for example, a single antenna, a multiple-in multiple-out (MIMO) antenna, a phase array, an antenna array with mechanical steering, or other types of antenna. In an example, when the device 310 is in transmission mode, the device 310 can transmit data, such as data 315, using modulated signals directed to different designated devices. When the device 310 is not in transmission mode, the device 310 can remain idled. In response to the device 310 being idled, a processor 335 of the device 330 can generate the data 315, where the data 315 can be a baseband signal. The processor 335 can be, for example, a computer, a controller, a microprocessor, and/or other types of computing device. The DAC 312 can receive the data 315 and can convert the data 315 into an analog signal. The transmitter 311 can receive the analog signal, converted from the data 315, from the DAC 312. The transmitter 311 can modulate at least one carrier frequency using the received analog signal to generate the modulated signals 305 and 306. In an example, when the device 310 is in a transmission mode, such as having a communication link established with one or more devices (e.g., devices 301, 303), the transmitter 311 can wirelessly transmit the modulated signals 305 and 306 to the devices 301 and 303, respectively, via the antenna 313.

When the device 310 is in transmission mode, the objects within an environment of the devices 301 and 303 can reflect the modulated signals 305 and 306 during the wireless transmission of the modulated signals 305 and 306 to devices 301, 303. The device 310 can transmit the modulated signal 305 to the device 301 in a first direction, and can transmit the modulated signal 306 to the device 303 in a second direction. An object 302 can reflect the modulated signal 305, and the device 330 can capture or detect the reflections of the modulated signal 305 as a reflected signal 320 at a first receiving angle. Similarly, an object 304 close to device 303 can reflect the modulated signal 306, and the device 330 can capture or detect the reflections of the modulated signal 306 as a reflected signal 321 at a second receiving angle. In an example embodiment, the objects reflecting the modulated signal 305 can be non-communicating entities, such as devices or objects that may not be equipped to transmit communication signals. For example, the objects 302 and 304 can be trees, buildings, people, vehicles, etc.

In another example where the device 310 is not in transmission mode, (e.g., no communication link is established between device 310 and any device), the data 315 can be a mock signal encoded with a mock message and without a designated receiving device. The device 310 can emit a modulated signal generated carrying the mock message in one or more directions, without being directed to any particular device within a communication range 337 of the device 310 or outside of the communication range 337. In some examples, the mock message can be pseudo-random data or standard preamble data that the device 310 can use to search for devices. In the example shown in FIG. 3, the devices 301 and 303 can be within the communication range 337 and need not receive or decode the messages or data being carried by the modulated signals 305 and 306. The broadcast or emission of the modulated signals 305 and 306 allows the system 300 to transmit mock messages in different directions, and receive reflections of the mock messages from objects within the communication range 337 (e.g., object 302 or objects surrounding the devices 301 and 303) at different receiving angles. The processor 335 can use, for example, the receiving times and the receiving angles of the reflections to estimate the distances and position of the objects reflecting the modulated signals 305, 306. The estimated distance and positions based on the reflections from objects within the communication range 337 can be used to image a scenery that may include the objects that reflected the modulated signals 305 and 306. As a result of being able to generate and emit these mock messages in various directions, the system 300 can perform a raster scan of the scenery within the communication range 337 image the scenery when the device 310 is not establishing communication links with devices.

The device 330 can include a sensing device 332, an antenna 333, and/or a processor 335. The antenna 333 can be coupled to the sensing device 332. The antenna 333 can be configured to capture or detect the reflected signals 320. The antenna can be, for example, a single antenna, a multiple-in multiple-out (MIMO) antenna, a phase array, an antenna array with mechanical steering, or other types of antenna. In some examples, the sensing device 332 and the antenna 333 can be components of a receiver device. In an example embodiment, the device 330 can include an analog-to-digital converter (ADC) 331 configured to convert the reflected signals 320, 321 into digital signals. The sensing device 332 can be further configured to capture or receive at least one loopback signals, such as a loopback signal 318 and a loopback signal 319, from the transmitter 311. The loopback signals 318, 319 can be loopback of the modulated signals 305, 306, respectively, from the transmitter 211. The loopback signals 318, 319 can be identical to the modulated signals 305, 306, respectively. In an example embodiment, there can be a wired connection between the transmitter 311 of the device 310 and the sensing device 332, and the loopback signals 318, 319 can be a baseband signal, an intermediate frequency (IF) signal, or a radio frequency (RF) signal obtained from the wired connection. In another example embodiment, the loopback signals 318, 319 can be obtained from IF leakage or RF leakage occurring at the transmitter 311. In an example embodiment, the transmission of the modulated signals 305, 306 can be split into two paths (e.g., wired connections or wireless channels), where one path feeds to the antenna 313 and the other path feeds to the sensing device 332.

The processor 335 can receive the digital signals (converted from the reflected signals 320, 321) from the ADC of the device 330, the loopback signals 318, 319 from the sensing device 332, and configuration data 317 from the transmitter 311. In some examples, the loopback signals 318, 319 can be sent to a ADC 334, and the ADC 334 can perform an analog to digital conversion on the loopback signals 318, 319 and transmit a digital version of the loopback signals 318, 319 to the processor 335. The configuration data 317 can include configurations of the transmitter 311 and/or the antenna 313 associated with the transmission of the modulated signal 305. For example, the configuration data 317 can include a first set of configurations indicating the antenna 313 that was used for the wireless transmission of the modulated signal 305. The configuration data 317 can include a second set of configurations indicating the antenna 313 that was used for the wireless transmission of the modulated signal 306. The processor 335 can be configured to estimate a distance of the object 302 using the reflected signals 320, 321, the loopback signals 318, 319, and/or the configuration data 317. The processor 335 can be further configured to generate image data representing an image 350 of a scenery surrounding the device 301. The processor 335 can be further configured to refine the image data, such as enhancing accuracy and resolution of the image data.

Figure 4:
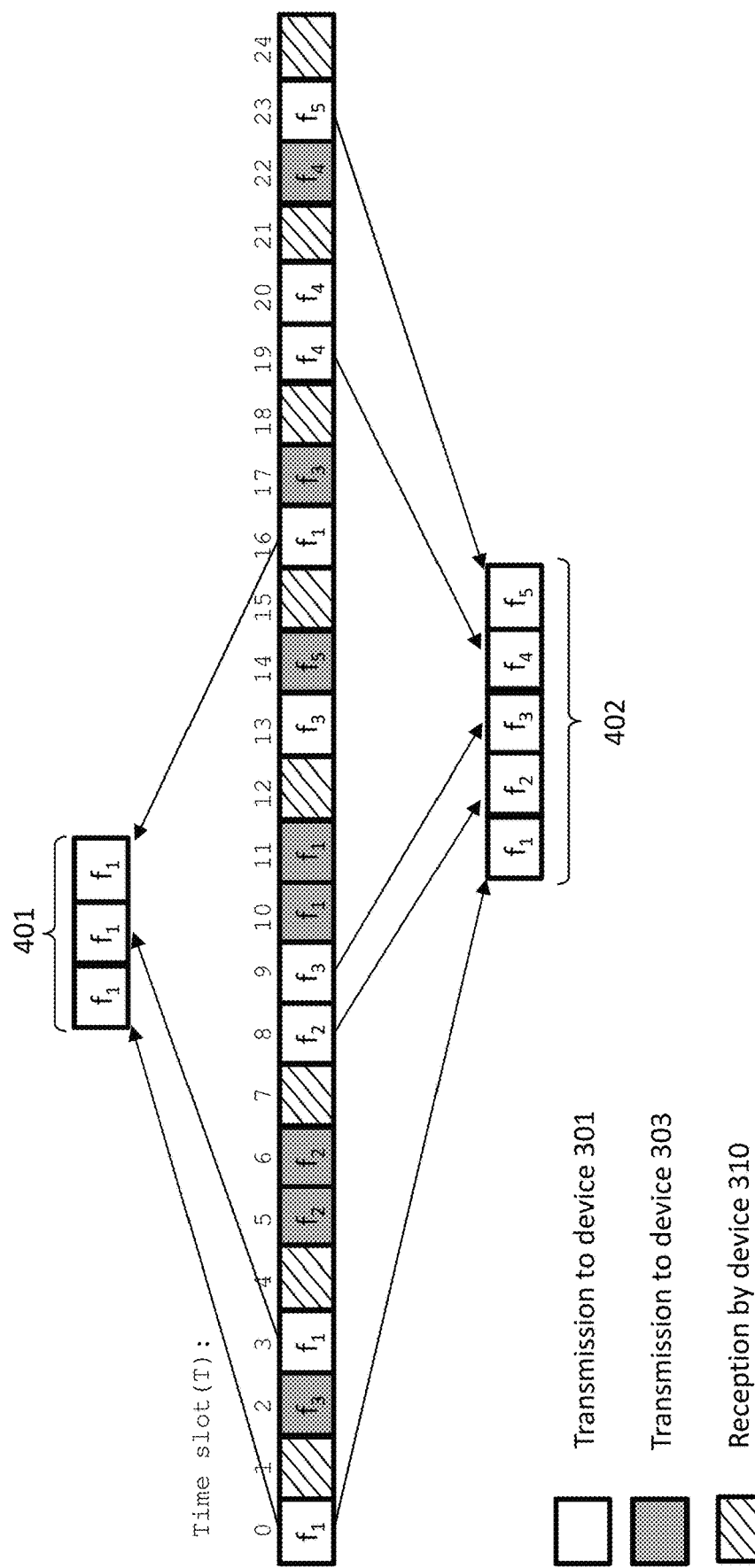
FIG. 4 is a diagram showing an example implementation of imaging with wireless communication signals.

FIG. 4 is a diagram showing an example implementation of the systems 100, 200, 300, shown in FIGS. 1, 2, and 3, respectively, to perform various image data enhancements. In the example shown in FIG. 4, and using the example in FIG. 3, the modulated signals being emitted or transmitted from the device 310 to the devices 301, 303 use different carrier frequencies $f_1, f_2, f_3, f_4, f_5$. The transmission of the modulated signals can be performed at different times. For example, at a time slot T=0, the device 310 can transmit a modulated signal to the device 301 using the carrier frequency $f_1$. At T=1, the device 310 can be in a reception mode such that no transmission occurs at T=1. At T=2, the device 310 can transmit another modulated signal to the device 303 using the carrier frequency $f_3$. At T=3, the device 310 can transmit another modulated signal to the device 301 using the carrier frequency $f_1$.

To improve an accuracy of the estimation of an object's distance, the processor 335 of the device 330 can average reflections of modulated signals that are transmitted at the same carrier frequency. For example, the transmitter 311 can continuously send configuration data 317 to the processor 335 indicating the carrier frequencies that are used to transmit modulated signals at each time slot T. In an example, a distance of a particular object was estimated using reflections of modulated signals transmitted at time slots T=0, 3, 16, using carrier frequency $f_1$. The processor 335 can determine an average 401 of these distance estimations from reflections at time slots T=0, 3, 16 to improve an accuracy of the estimated distance of the particular object. The averaged estimated distance can be used by the processor 335 to update image data associated with the particular object, enhancing an accuracy of the image data. Note that this embodiment to improve the accuracy can also reduce the signal-to-noise ratio (SNR) of the image data.

To improve a resolution of the image data, the processor 335 of the device 330 can merge or stitch reflections of modulated signals that are transmitted at different carrier frequencies. For example, the transmitter 311 can continuously send configuration data 317 to the processor 335 indicating the carrier frequencies that are used to transmit modulated signals at each time slot T. In an example, at T=10, the device 310 has transmitted modulated signals using carrier frequencies $f_1$, $f_2$, $f_3$. A first image data can be generated using reflections of modulated signals transmitted from T=0 to T=10. Between T=10 and T=23, the device 310 has transmitted modulated signals using additional carrier frequencies $f_4$ and $f_5$. To improve the resolution of the first image data, the processor 335 can merge or stitch reflections of modulated signals having different carrier frequencies and transmitted at time slots T=0, 8, 9, 19, 23 to generate a stitched signal 402. The stitched signal 402 can be used to update the first image data to improve the resolution of the first image data.

Figure 5:
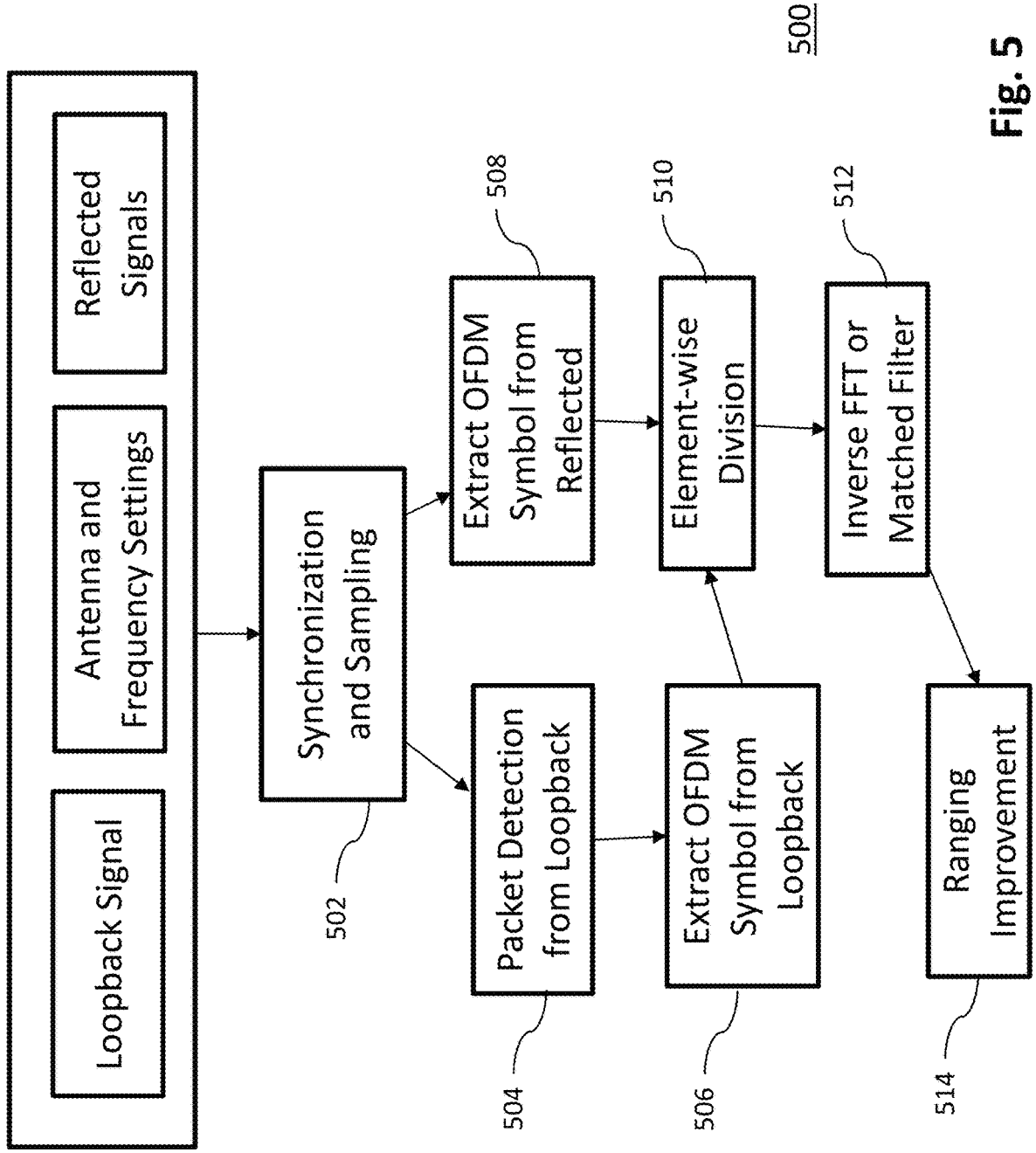
FIG. 5 is a diagram showing another example implementation of imaging with wireless communication signals.

FIG. 5 is a flow diagram illustrating a process 500 to implement imaging with wireless communication signals. The process 500 may include one or more operations, actions, or functions as illustrated by one or more of blocks 502, 504, 506, 508, 510, 512, and/or 514. Although illustrated as discrete blocks, various blocks can be divided into additional blocks, combined into fewer blocks, eliminated, or performed in parallel, depending on the desired implementation.

The process 500 can begin at block 502. At block 502, a device can receive various inputs that may be used to implement imaging with wireless communication signals. A first input can be a loopback signal of a modulated being transmitted wirelessly from the device. A second input can be configuration data including antenna settings and frequency settings that were used to transmit the modulated signal. A third input can be reflected signals resulting from reflections of the transmitted modulated signal from at least one object. If the device implements a software defined radio (SDR), the device can perform frequency and phase synchronizations on a loopback channel and a receiver channel. The loopback channel can be a channel facilitating reception of the loopback signal and the receiver channel can be a channel facilitating receipt of the reflected signals. The frequency and phase synchronization can allow the loopback and receiver channels to share the same phase offset. The frequency and phase synchronization can be performed using common sampling clocks. For example, the loopback channel and the receiver channel can each be connected to a respective analog-to-digital converter (ADC), where these two ADCs can share the same clock signal (common sampling clock) to perform sampling operations. Further, in examples where the device implements SDR, synchronization of baseband clocks may also be performed. For example, when the loopback channel and the receiver channel have clock signals generated from different PLLs and the different PLLs share the same reference clock, the PLLs can generate outputs that are phase synchronized with each other.

The process 500 can continue from block 502 to block 504. At block 504, the device can perform packet detection on the loopback signal. In an example, the packet detection can include extracting a start time of the transmission of data packets including the modulated signal. The start time can be extracted from the loopback signal and/or the antenna and frequency settings received at block 502.

In examples where the modulated signal uses a single carrier frequency, the process 500 can continue from block 504 to block 512. At block 512, the device can apply a matched filter on the reflected signal to correlate the reflected signal with the loopback signal. The device can determine a time of flight and signal strength of the reflected signal using the result of the application of the matched filter. The device can determine a distance of one or more objects that reflected the modulated signal. The process 500 can continue from block 512 to block 514. At block 514, the device can perform ranging improvements to improve an accuracy and/or a resolution of the determined distance.

In examples where the modulated signal uses a plurality of carrier frequencies, such as OFDM implementations, the process 500 can continue from block 502 to block 508, and from block 504 to block 506. At block 506, the device can extract OFDM symbols from the loopback signal. At block 508, the device can extract OFDM symbols from the reflected signal. The process 500 can continue from blocks 506 and 508 to block 510. At block 510, the device can perform element-wise division to divide symbols of the reflected signal by corresponding symbols of the loopback signal. The process 500 can continue from block 510 to block 512. At block 512, in examples where the modulated signal is a OFDM signal, the device can perform inverse FFT and/or apply matched filters on a frequency response outputted by the element-wise division. The device can determine a distance of one or more objects that reflected the modulated signal based on the frequency response. The process 500 can continue from block 512 to block 514. At block 514, the device can perform ranging improvements to improve an accuracy and/or a resolution of the determined distance.

In an example embodiment, the modulated signal can be an OFDM communication signal. The OFDM signal can multiplex complex modulation symbols onto K uniformly spaced orthogonal subcarriers with a gap $\Delta f$. The passband transmitted signal s(t) after applying Inverse Fast Fourier Transform (IFFT) on the subcarriers can be denoted as:

$$s(t) = \left( \sum_{k=1}^{K} A_k e^{j(2\pi k \Delta f t + \psi_k)} \right) e^{j2\pi f_c t}$$

where t denotes time, and $A_k$ and $\psi_k$ denote the amplitude and phase of the data symbol modulated on the $k^{th}$ subcarrier, respectively, and $f_c$ denotes the passband center frequency. If the OFDM packet is reflected by an object at distance R and captured by receiver (e.g., device 130, 230, or 330) at the base station (e.g., device 110, 210, 310). The received reflected signal or echo with a round-trip Time-of-Flight (ToF) $\tau_l=2R/c$ and attenuation $\alpha_l$ can be written as $x_{rf}(t)=\alpha_l s(t-\tau_l)$, where c denotes the speed of light. The received reflected signal $x_{rf}$ can be down-converted to a baseband signal $x_b$, and a phase offset $\phi$ can be caused by the receiver Phase-Locked Loop (PLL). The baseband signal $x_b$ can be sampled and fed to an OFDM receiver pipeline for range processing (e.g., estimation of object distance).

In some examples, the sampling and detection of the OFDM packet can introduce a packet detection delay $\tau_d$. In some examples, the packet detection delays can be an order-of-magnitude larger than the ToF. Therefore, an estimation of the object distance may need to account for this packet detection delay. As a result, the baseband signal $x_b$ can be expressed as:

$$x_b(t) = \alpha_l e^{-j2\pi f_c \tau_l} e^{-j\phi} \sum_{k=1}^{K} A_k e^{j\psi_k} e^{j2\pi k \Delta f t} e^{-j2\pi k \Delta f (\tau_l + \tau_d)}$$

The baseband signal $x_b$ can be converted into complex modulated subcarriers in the frequency domain using FFT, resulting in:

$$X_b[k] = \alpha_l e^{-j2\pi f_c \tau_l} e^{-j\phi} A_k e^{j\psi_k} e^{-j2\pi k \Delta f (\tau_l + \tau_d)}$$

In order to extract the distance of the object, the originally modulated symbols can be removed, the PLL phase offset $\phi$ can be eliminated from $X_b[k]$, and the packet detection delay can be canceled out. A loopback signal of the modulated signal can be used to remove the modulated symbols, the PLL phase offset, and to cancel out the packet detection delay. Upon frequency and phase synchronization, the symbols of the loopback signal can be denoted as:

$$r_b[k] = e^{-j2\pi f_c \tau_{loop}} e^{-j\phi} A_k e^{j\psi_k} e^{-j2\pi k \Delta f (\tau_{loop} + \tau_d)}$$

where $\tau_{loop}$ denotes a delay experienced by the loopback signal.

Element-wise division can be performed on $X_b[k]$ by the loopback signals $r_b[k]$. As a result of performing the element-wise division, the modulated symbols, the PLL phase offset, and the packet detection delay can be removed, and the result is indicated by a frequency response denoted as:

$$H[k] = \alpha_l e^{-j2\pi((f_c + k\Delta f)(\tau_l - \tau_{loop}))}$$

In some examples, the element-wise division can remove or cancel out common variables and/or values between the loopback signals and the received reflected signals, and the result of the element-wise division can include uncommon delays between the loopback signals and the received reflected signals. For example, if the loopback signal is a radio frequency (RF) signal, the element-wise division can yield $\tau_{loop}=0$ and a desired value for $\tau_l$. If the loopback signal is an intermediate frequency (IF) signal, the element-wide division can cancel out the delay in the receiver from the IF down to a ADC of the device. Any delay in the transmit chain from the point where the loopback is received, and any delay in the receiver chain until the IF, is going to remain. There can also be some delay in the loopback signal cable connecting the transmitter and the loopback processing circuits then subtracts out of the delays in the transmit and receiver chain. Overall, $\tau_{loop}$ can capture the uncanceled delays in the transmit channel and receiver channel minus the cable delay in the loopback signal. If the cable delay is calibrated to be equal to the delay in the transmit and receiver chains, $\tau_{loop}=0$. In some examples, calibration can be done in hardware using matched cables, and in other cases, the calibration can be done with digital delay in the signal.

In some examples, using the example in FIG. 2, the RF signal that can be received by the receiver antennas 233 get can also contain leakage from the transmit antennas 213. In that case, with ideal implementation or with perfect calibration, this received signal can appear at a distance of zero after the processing of the signal in addition to the reflection from the environment. In some examples, an automatic calibration algorithm can optimize the calibration of $\tau_{loop}$ such that the leakage signal can result in an image at distance zero.

Various distance estimation algorithms such as FFT or matched filters can be applied on H[k] to extract the ToF and signal strength of the reflected signal.

In examples where there are multiple objects reflecting the modulated signal, such as L objects, the baseband subcarrier symbols can be denoted as:

$$X_b[k] = \sum_{l=1}^{L} \alpha_l e^{-j2\pi f_c \tau_l} e^{-j\phi} A_k e^{j\psi_k} e^{-j2\pi k \Delta f (\tau_l + \tau_d)}$$

Further, the resulting frequency response from the element-wise division can be denoted as:

$$H[k] = \sum_{l=1}^{L} \alpha_l e^{-j2\pi((f_c + k\Delta f)(\tau_l - \tau_{loop}))}$$

A range profile can be obtained by applying FFT on H [k], and the result can be denoted as:

$$p[u] = \sum_{l=1}^{L} \alpha_l \delta(u - \Delta f(\tau_l - \tau_{loop})) e^{-j2\pi f_c (\tau_l - \tau_{loop})}$$

A resolution of OFDM ranging can be based on the resolution in distinguishing slope of phase shift, or in the other words, the subcarrier domain FFT bin size $1/K\Delta f$. A range resolution can be derived based on the bandwidth of the waveform:

$$\text{Resolution} = \frac{c\Delta\tau}{2} = \frac{c}{2K\Delta f} = \frac{c}{2B}$$

where B denotes the bandwidth of the waveform, and c denotes the speed of light.

Figure 6:
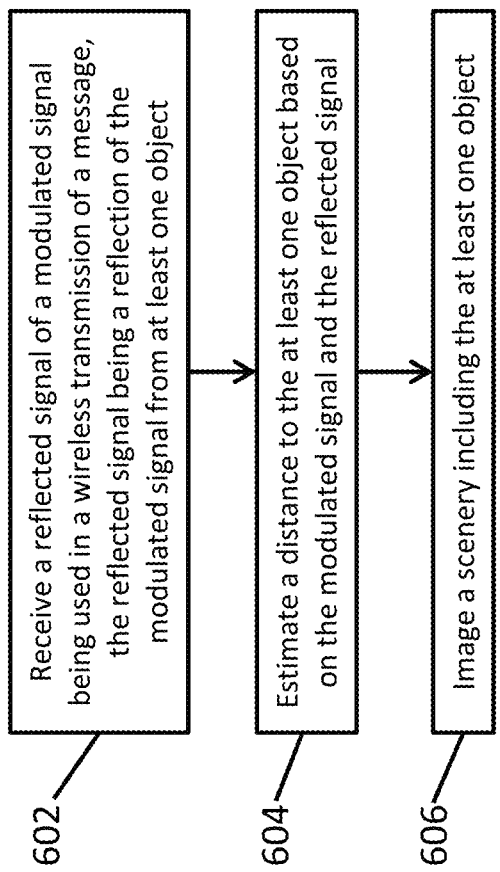
FIG. 6 is a flow diagram illustrating a process to implement imaging with wireless communication signals in one embodiment.

FIG. 6 is a flow diagram illustrating a process 600 to implement imaging with wireless communication signals in one embodiment. An example process may include one or more operations, actions, or functions as illustrated by one or more of blocks 602, 604, and/or 606. Although illustrated as discrete blocks, various blocks can be divided into additional blocks, combined into fewer blocks, eliminated, or performed in parallel, depending on the desired implementation.

The process 600 can begin at block 602, where a device can receive a reflected signal of a modulated signal being used in a wireless transmission of data. The reflected signal can be a reflection of the modulated signal from at least one object. In some examples, the wireless transmission of the data can be from a first device to a second device. The process 600 can proceed from block 602 to block 604. At block 604, the device can estimate a distance to the at least one object based on the modulated signal and the reflected signal. The process 600 can proceed from block 604 to block 606. At block 606, the device can use the estimated distance to image a scenery including the at least one object.

In an example embodiment, the modulated signal can use a plurality of carrier frequencies, and the reflected signal can include a plurality of symbols corresponding to the plurality of carrier frequencies. The device can receive a loopback signal of the modulated signal. The device can perform element-wise division on the plurality of symbols of the reflected signal by corresponding symbols of the loopback signal. The device can estimate the distance based on a frequency response resulting from the element-wise division. In some examples, the modulated signal can be an orthogonal frequency-division multiplexing (OFDM) signal.

In another example embodiment, the modulated signal can use a carrier frequency. The device can receive a loopback signal. The device can apply a matched filter to the reflected signal. The device can estimate the distance using a result from the application of the matched filter.

In some examples, the loopback signal can be one of a baseband signal obtained from a wired connection, an intermediate frequency (IF) signal obtained from a wired connection, a radio frequency (RF) signal obtained from a wired connection, a signal obtained from IF leakage, and a signal obtained from RF leakage.

Figure 7:
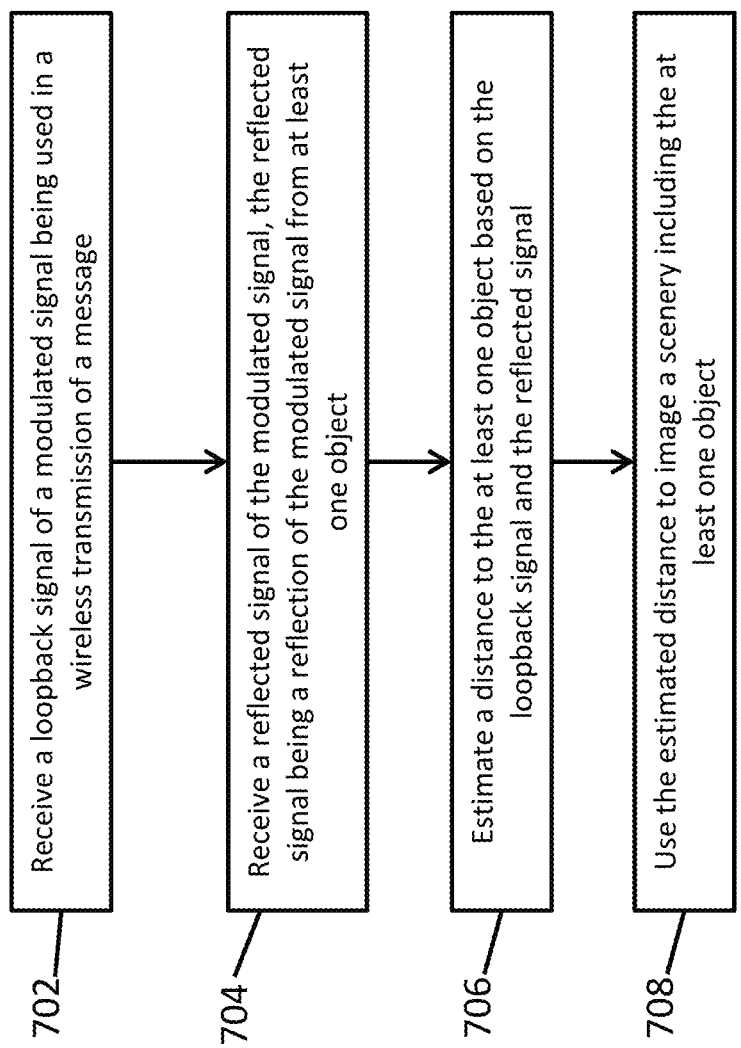
FIG. 7 is a flow diagram illustrating another process to implement imaging with wireless communication signals in one embodiment.

FIG. 7 is a flow diagram illustrating a process 700 to implement imaging with wireless communication signals in one embodiment. An example process may include one or more operations, actions, or functions as illustrated by one or more of blocks 702, 704, 706, and/or 708. Although illustrated as discrete blocks, various blocks can be divided into additional blocks, combined into fewer blocks, eliminated, or performed in parallel, depending on the desired implementation.

The process 700 can begin at block 702, where a device can receive a loopback signal of a modulated signal being used in a wireless transmission of data. In some examples, the wireless transmission of the data can be from a first device to a second device. The process 700 can proceed from block 702 to block 704. At block 704, the device can receive a reflected signal of the modulated signal. The reflected signal can be a reflection of the modulated signal from at least one object. The process 700 can proceed from block 704 to block 706. At block 706, the device can estimate a distance to the at least one object based on the loopback signal and the reflected signal. The process 700 can proceed from block 706 to block 708. At block 708, the device can use the estimated distance to image a scenery including the at least one object.

In an example embodiment, the modulated signal can use a plurality of carrier frequencies, and the reflected signal can include a plurality of symbols corresponding to the plurality of carrier frequencies. The device can perform element-wise division on the plurality of symbols of the reflected signal by corresponding symbols of the loopback signal. The device can estimate the distance based on a frequency response resulting from the element-wise division. In some examples, the modulated signal can be an orthogonal frequency-division multiplexing (OFDM) signal.

In another example embodiment, the modulated signal can use a carrier frequency. The device can apply a matched filter to the reflected signal. The device can estimate the distance using a result from the application of the matched filter.

In some examples, the loopback signal can be one of a baseband signal obtained from a wired connection, an intermediate frequency (IF) signal obtained from a wired connection, a radio frequency (RF) signal obtained from a wired connection, a signal obtained from IF leakage, and a signal obtained from RF leakage.

Figure 8:
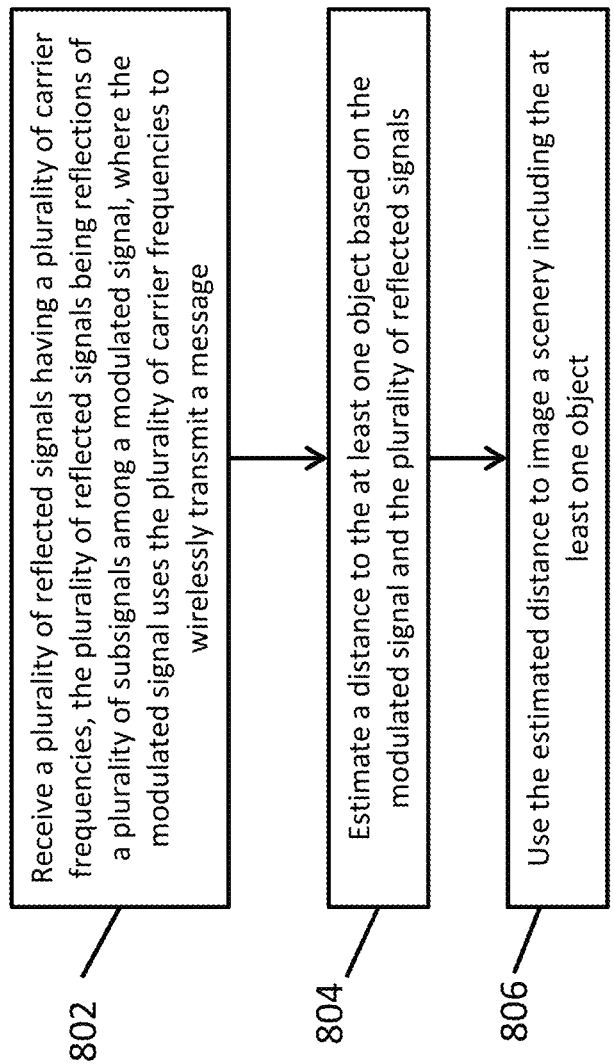
FIG. 8 is a flow diagram illustrating another process to implement imaging with wireless communication signals in one embodiment.

FIG. 8 is a flow diagram illustrating a process 800 to implement imaging with wireless communication signals in one embodiment. An example process may include one or more operations, actions, or functions as illustrated by one or more of blocks 802, 804, and/or 806. Although illustrated as discrete blocks, various blocks can be divided into additional blocks, combined into fewer blocks, eliminated, or performed in parallel, depending on the desired implementation.

The process 800 can begin at block 802, where a device can receive a plurality of reflected signals having a plurality of carrier frequencies. The plurality of reflected signals can be reflections of a plurality of modulated signals. The plurality of modulated signals can use the plurality of carrier frequencies to wirelessly transmit data. In some examples, the wireless transmission of the data can be from a first device to a second device. In some examples, the modulated signal can be an orthogonal frequency-division multiplexing (OFDM) signal. The process 800 can proceed from block 802 to block 804. At block 804, the device can estimate a distance to the at least one object based on the plurality of modulated signals and the plurality of reflected signals. The process 800 can proceed from block 804 to block 806. At block 806, the device can use the estimated distance to image a scenery including the at least one object.

In an example embodiment, the device can receive a plurality of loopback signals of the plurality of subsignals. The device can perform element-wise division on the plurality of symbols of the reflected signals by corresponding symbols of the loopback signals. The device can estimate the distance based on a frequency response resulting from the element-wise division. In some examples, the plurality of loopback signals can be a baseband signal obtained from a wired connection, an intermediate frequency (IF) signal obtained from a wired connection, a radio frequency (RF) signal obtained from a wired connection, a signal obtained from IF leakage, or a signal obtained from RF leakage.

In some examples, the device can merge a subset of the plurality of reflected signals having different carrier frequencies to modify a resolution of image data corresponding to the imaged scenery. In some examples, the device can determine an average of a subset of the plurality of reflected signals having the same carrier frequency to modify a signal to noise ratio (SNR) of image data corresponding to the imaged scenery.

Figure 9:
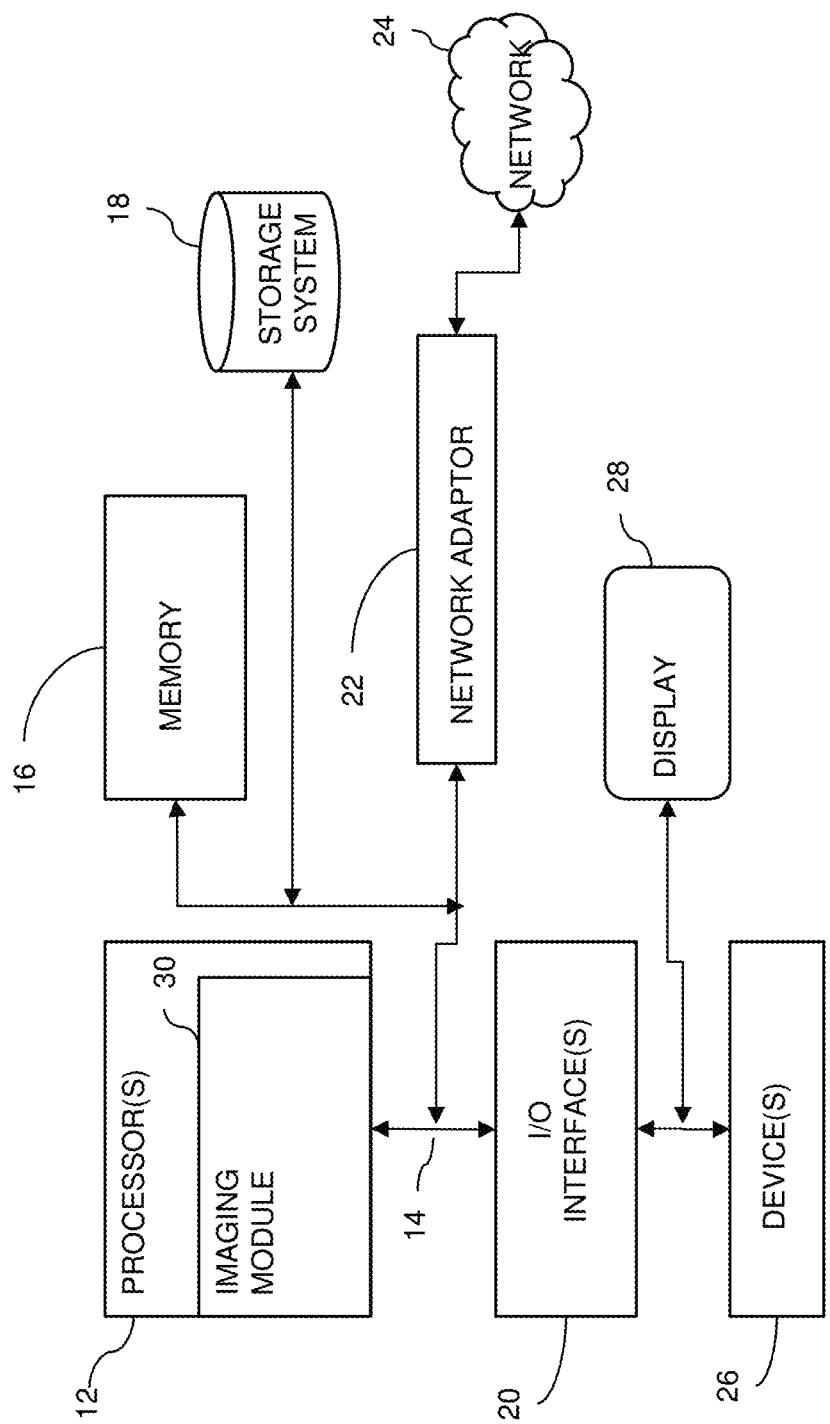
FIG. 9 illustrates a schematic of an example computer or processing system that can implement imaging with wireless communication signals in one embodiment of the present disclosure.

FIG. 9 illustrates a schematic of an example computer or processing system that can implement imaging with wireless communication signals in one embodiment of the present disclosure. The computer system is only one example of a suitable processing system and is not intended to suggest any limitation as to the scope of use or functionality of embodiments of the methodology described herein. The processing system shown can be operational with numerous other general purpose or special purpose computing system environments or configurations. Examples of well-known computing systems, environments, and/or configurations that can be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system can be described in the general context of computer system executable instructions, such as program modules, being executed by a computer system. Generally, program modules may include routines, programs, objects, components, logic, data structures, and so on that perform particular tasks or implement particular abstract data types. The computer system can be practiced in distributed cloud computing environments where tasks are performed by remote processing devices that are linked through a communications network. In a distributed cloud computing environment, program modules can be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., imaging module 30) that performs the methods described herein. The module 30 can be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media can be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces. In some examples, the system memory 16 can include a structure including one or more capacitive processing units as described herein.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention can be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, by a sensing module integrated with a communication device, a modulated signal as a loopback signal, wherein the modulated signal is modulated with data for a designated device, the modulated signal is distributed to the sensing module and to a wireless channel to cause a wireless transmission of the data to the designated device, and the modulated signal uses a plurality of sub-carrier frequencies;

receiving, by the sensing module integrated with the communication device, a reflected signal of the modulated signal, wherein the reflected signal is a reflection of the modulated signal from at least one object different from the designated device, and the reflected signal includes a plurality of symbols corresponding to the plurality of sub-carrier frequencies;

performing element-wise division on the plurality of symbols of the reflected signal by corresponding symbols of the loopback signal; and estimating, by the sensing module integrated with the communication device, a distance to the at least one object based on a frequency response resulting from the element-wise division.

2. The method of claim 1, further comprising using at least the estimated distance to image a scenery including the at least one object.

3. The method of claim 2, wherein the scenery is a three-dimensional image.

4. The method of claim 1, wherein the at least one object is a non-communicating entity.

5. The method of claim 1, wherein:
the wireless transmission via the wireless channel uses a first set of antennas of the communication device; and
receiving the reflected signal of the modulated signal comprises receiving the reflected signal via a second set of antennas of the sensing module.

6. The method of claim 1, further comprising:
in response to an absence of communication links being established by the communication device, the modulated signal is a mock modulated signal that encodes a mock message without being directed to a designated receiving device;
receiving, by the sensing module, reflections of the mock modulated signal from objects within a communication range;
estimating, by the sensing module, distances to the objects within the communication range that reflected the mock modulated signal based on the loopback signal and the reflected signal.

7. The method of claim 1, further comprising using at least one of a transmission angle of the modulated signal and a receiving angle of the reflected signal to estimate a position of the at least one object.

8. A method comprising:
receiving a plurality of reflected signals having a plurality of carrier frequencies, the plurality of reflected signals being reflections of a plurality of modulated signals, wherein the plurality of modulated signals uses the plurality of carrier frequencies to wirelessly transmit data;
estimating a distance to at least one object based on the plurality of modulated signals and the plurality of reflected signals;
using at least the estimated distance to image a scenery including the at least one object; and
merging a subset of the plurality of reflected signals having different carrier frequencies to modify a resolution of image data corresponding to the imaged scenery.

9. The method of claim 8, wherein each modulated signal among the plurality of modulated signals uses a plurality of sub-carrier frequencies, and each reflected signal among the plurality of reflected signals includes a plurality of symbols corresponding to the plurality of sub-carrier frequencies, and the method further comprising:

receiving a plurality of loopback signals of the plurality of modulated signals;
performing element-wise division on the plurality of symbols of the reflected signals by corresponding symbols of the loopback signals; and
estimating the distance based on a result of the element-wise division.

10. The method of claim 9, wherein each loopback signal among the plurality of loopback signals is one of:
a baseband signal obtained from a wired connection;
an intermediate frequency (IF) signal obtained from a wired connection;
a radio frequency (RF) signal obtained from a wired connection;
a signal obtained from IF leakage; and
a signal obtained from RF leakage.

11. The method of claim 8, wherein the wireless transmission of the data is from a first device to a second device.

12. The method of claim 8, further comprising:
determining an average of distances estimated from a subset of the plurality of reflected signals having the same carrier frequency; and
using the average of distances to update the image data corresponding to the imaged scenery, wherein the update to the image data reduces the signal-to-noise ratio (SNR) of the image data.

13. The method of claim 8, wherein the plurality of modulated signals are orthogonal frequency-division multiplexing (OFDM) signals.

14. A system comprising:
a base station;
a transmitter configured to output a modulated signal that is modulated with data for a designated device, wherein the modulated signal is distributed to the base station and to a wireless channel to cause a wireless transmission of the data to the designated device, and the modulated signal uses a plurality of sub-carrier frequencies;
the base station being configured to:
receive the modulated signal as a loopback signal;
receive a reflected signal of the modulated signal, wherein the reflected signal is a reflection of the modulated signal from at least one object different from the designated device, and the reflected signal includes a plurality of symbols corresponding to the plurality of sub-carrier frequencies;
perform element-wise division on the plurality of symbols of the reflected signal by corresponding symbols of the loopback signal; and
estimate a distance to the at least one object based on a frequency response resulting from the element-wise division.

15. The system of claim 14, wherein the base station is configured to use at least the estimated distance to image a scenery including the at least one object.

16. The system of claim 15, wherein the scenery is a three-dimensional image.

17. The system of claim 14, wherein the at least one object is a non-communicating entity.

18. The system of claim 14, further comprising a first set of antennas and a second set of antennas, wherein:
the wireless transmission via the wireless channel uses the first set of antennas; and
reflected signal of the modulated signal are received by the second set of antennas.

19. The system of claim 14, wherein:
- in response to an absence of communication links being established by the transmitter, the modulated signal is a mock modulated signal that encodes a mock message without being directed to a designated receiving device;
- the base station is configured to:
  - receive reflections of the mock modulated signal from objects within a communication range; and
  - estimate distances to the objects within the communication range that reflected the mock modulated signal based on the loopback signal and the reflected signal.

\* \* \* \* \*